March 8, 1966 E. SIMICH ET AL 3,239,201

HEAT TREATING AND QUENCHING APPARATUS

Filed Dec. 14, 1961 2 Sheets-Sheet 1

INVENTORS.
Emil Simich
James N. Wognum
By William P. Porcelli
Attorney

March 8, 1966  E. SIMICH ET AL  3,239,201
HEAT TREATING AND QUENCHING APPARATUS
Filed Dec. 14, 1961  2 Sheets-Sheet 2

INVENTORS.
Emil Simich
James N. Wognum
By William P. Porcelli
Attorney

United States Patent Office 3,239,201
Patented Mar. 8, 1966

3,239,201
HEAT TREATING AND QUENCHING APPARATUS
Emil Simich and James N. Wognum, Chicago, Ill., assignors to Interlake Iron Corporation, a corporation of New York
Filed Dec. 14, 1961, Ser. No. 159,338
12 Claims. (Cl. 266—3)

This invention relates to the electrical heating of metal strips.

In electrical heating of metal strip in a continuous manner, inductive heating by means of a transformer principle has been accomplished with varying degrees of success. The general manner of heating by a transformer is to supply a primary coil with an alternating electric current and place the metal to be heated in inductive relationship with the primary coil so that the strip is heated by its own resistance due to the induced current. Various techniques have been employed to bring the metal to be heated into inductive relationship with the primary coil. For instance, the strip has been passed continuously through a primary coil in order to have the metal heated by locally induced magnetic and electrical eddy currents. This has proven to be highly inefficient because it has been difficult to induce eddy currents of sufficient magnitude to heat the strip to effective heat treating temperatures. Another method employed is to pass the strip through a primary induction means and provide an effective closed strip loop by passing both ends of the strip around contacting metal sheaves which act as the contactors to close the strip loop. This has a disadvantage that arcing results between the metal sheaves in contact with each other and with the strip in contact with the sheaves so that the efficiency of the system is minimized. Also, arcing provides hot spots on the strip, uneven voltage to objectionably vary the heat treating characteristics, and excessive wear of the contact regions where the arcing occurs so that the maintenance cost is high. There are other variations of this system and all seem to have certain disadvantages.

It is an important object of this invention to provide inductive heating of metal strip where the metal strip is maintained in a closed inductive loop as the effective secondary of the transformer system without the disadvantages of arcing at the contact regions which close the strip loop.

It is still another object of the invention to provide inductive heating of metal strip whereby the closed electrical secondary loop formed by the strip is completed by means of a contactor in the form of a bath of a conducting liquid, such as molten lead, through which the two ends of the strip loop pass simultaneously.

The use of molten lead as the contactor for the closed strip loop has the additional advantage that the lead can be used as a quenching medium for part of the heat treating cycle. As a substitute for the lead, a conducting salt can be used under certain conditions. The quenching effect is substantially the same.

It is still another object to provide such a transformer type heating apparatus employing a liquid conducting medium to complete a secondary loop for the strip which also employs regenerative heating in order to minimize the total heat required for heat treating the strip.

It is another object of the invention to provide a compact transformer type heat treating apparatus which occupies little space compared to other known heat treating devices to thereby allow the heat treating apparatus to be built at relatively low cost and used in a relatively small work area.

It is still another object of the invention to provide such a transformer type heat treating apparatus which is relatively safe electrically because none of its exposed portions are at high voltage.

Another object of the invention is to provide improved baffle means in the molten conducting liquid portion of the apparatus which allows special regenerative type heating in a localized region of the bath for accurate temperature control of one portion of the bath relative to another.

Other objects and advantages of the invention should become apparent upon reference to the accompanying drawings, in which FIG. 1 shows a vertical elevation in cross-section of a heat treating apparatus embodying the invention;

FIG. 3 shows a sectional view along 3—3 of FIG. 2; and

FIG. 4 shows a simplified schematic of the electrical circuit embodied in the apparatus.

Figure 1:
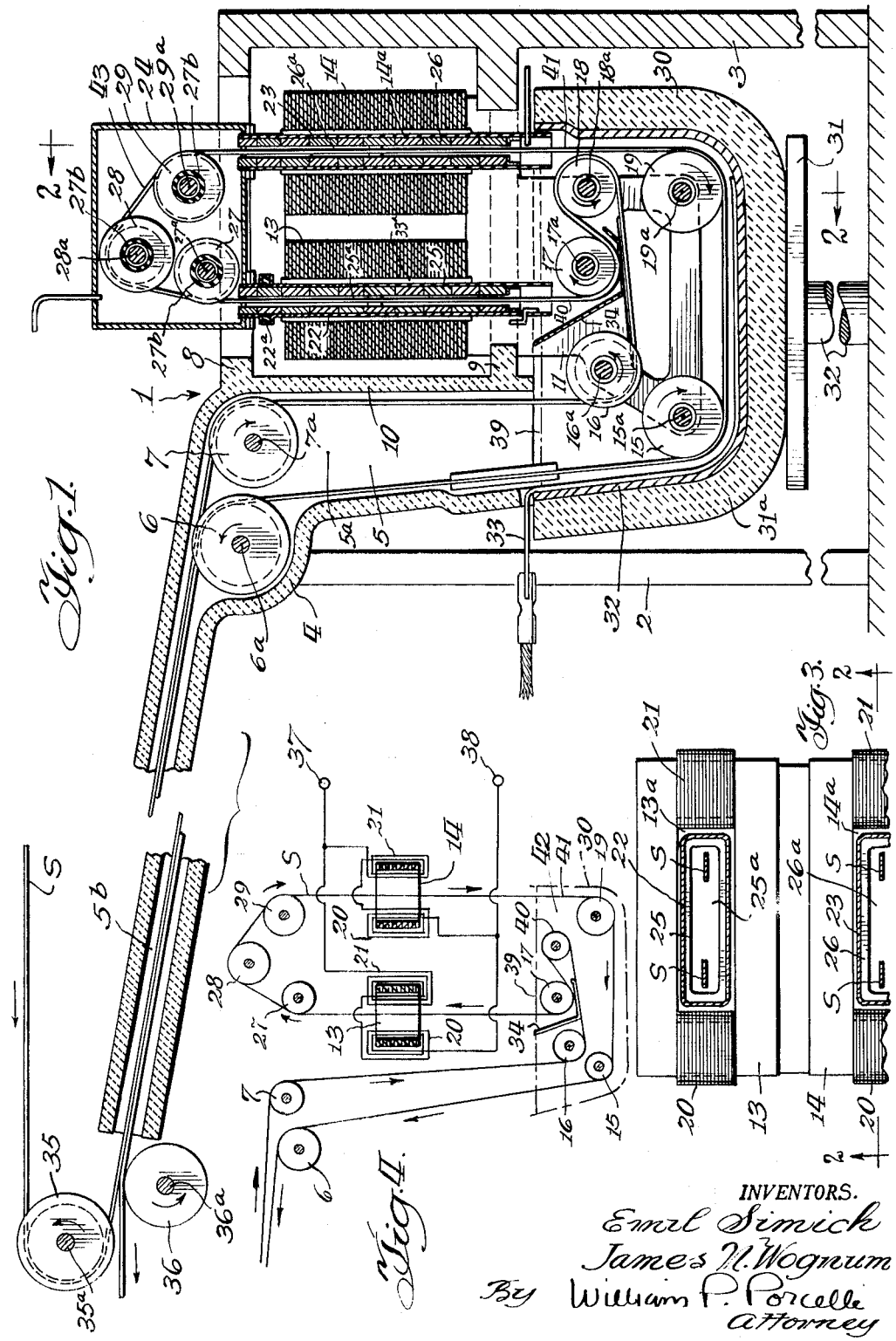

As shown in FIG. 1, an embodiment of the heat treating apparatus 1 is suitably supported by two leg members 2 and 3. The one leg member 2 connects at its upper end to a wall 4 which is manufactured of an electrical non-conducting material, such as firebrick or other ceramic. The wall is part of a hollow chamber 5 which extends from a relatively wide vertical chamber portion 5a to a substantially horizontal narrower chamber portion 5b so that both chamber portions 5a and 5b extend at substantially right angles to each other. At the intersection of both portions, there are mounted two sheaves 6 and 7 on shafts 6a and 7a which are secured in the walls of the chamber 5. The inner wall 10 of the chamber 5 is provided with two connecting portions 8 and 9 which extend to the other support leg 3 so that the two legs 2 and 3, the chamber 5 and the connecting members 8 and 9 are unitary. Also, these portions are preferably of ceramic or other electrically nonconducting materials where they are joined to each other. As an alternative to such a construction, these members can be made of electrically conducting materials provided they have electrically nonconducting joints between them.

Figure 2:
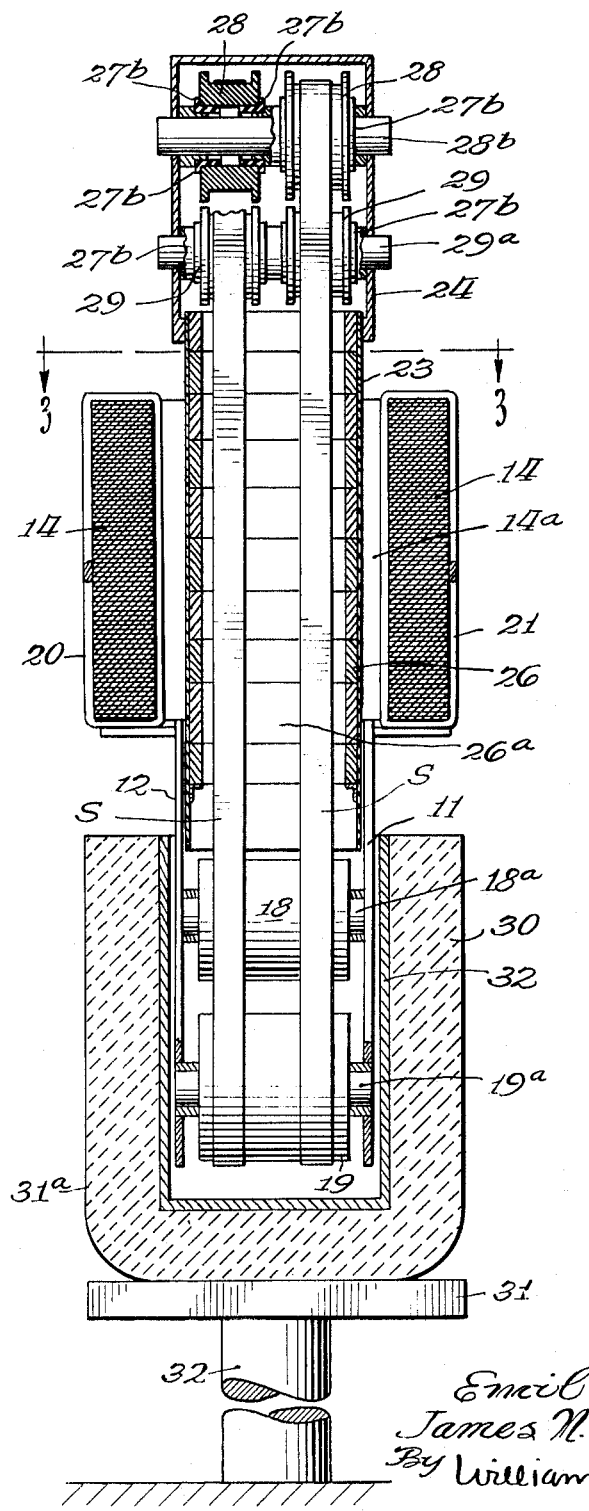
FIG. 2 shows a vertical section of the principal parts of the same apparatus as viewed along line 2—2 of FIG. 1.

Suitably supported by the connector 9 is a pair of parallel plates 11 and 12 (FIGS. 1 and 2). These parallel plates 11 and 12 support two transformer cores 13 and 14 above them. At their lower ends they are provided with five shafts 15a, 16a, 17a, 18a and 19a supported between them. These shafts rotatably support five sheaves 15, 16, 17, 18 and 19, respectively. Since this lower portion of the plates 11 and 12 and all of the sheaves 15 through 19 and their supporting shafts are submerged in a molten conducting fluid during operation of the apparatus, there is no need to provide any electrical insulation between these parts.

The cores 13 and 14 are each provided with two primary windings 20 and 21 so that there are both a primary winding 20 and a primary winding 21 on both cores. The position of the windings 20 and 21 on each core are apparent from FIG. 3.

Each core 13 and 14 is composed of a plurality of sheet-like laminations of rectangular shape stacked upon each other. They are all provided with a central rectangular opening so that each core 13 and 14 is provided with a corresponding central rectangular cross-section opening 13a or 14a.

Mounted through each of these openings 13a and 14a are two tubes 22 and 23 which are out of contact with the walls of the openings 13a and 14a. These tubes 22 and 23 are suspended from the bottom portion of a controlled atmosphere chamber 24 which is secured to the connecting member 8 of the apparatus support means. The tube 22 is provided with a joint 22a which divides the tube 22 into two lengths electrically insulated from each other. The purpose of this joint 22a is to provide a break in the electrical conductivity of the tube 22 so that there is no closed electrical circuit between the parts of the chamber 24, the two tubes 22 and 23, and the liquid conducting medium used to surround the sheaves 15 through 19. The other tube 23 is of a single length. Although the tubes 22 and 23 can be made of metal for strength purposes, they are preferably lined with a plurality of stacked refractory bricks 25 to 26, each having a hollow center to create hollow refractory tubes within the tubes 22 and 23 which provide insulation walls inside the tubes 22 and 23. The hollow openings 25a and 26a provide passages through which the metal strip S can be passed.

The controlled atmosphere chamber 24 is preferably airtight and filled with an inert gas during the operation of the apparatus. It is provided with three sheaves 27, 28 and 29 mounted on shafts 27a, 28a and 29a secured in the side walls of the chamber 24. The sheaves 27, 28 and 29 are electrically insulated by bushings 27b of insulating material from their shafts 27, 28 and 29 in order to prevent a short circuit for the electric current flow through the metal chamber 24.

Mounted below the bottom ends of the tubes 22 and 23 and normally surrounding the plates 11 and 12 and their sheaves is a quenching pot 30 which is supported on a platen 31 mounted on the upper end of a piston rod 32. The piston rod 32 is connected to a piston of an ordinary type hydraulic cylinder operable to cause the platen 31 to be raised or lowered for maintenance purposes. In operation, the pot 30 is positioned as shown in FIGS. 1 and 2, but lowered clear of the sheaves 15 through 19 when access to these sheaves and related parts is necessary. This pot 30 is preferably of a refractory material at its outer shell 31a and provided with a metallic liner 32. A heating element 33 is positioned along the inner wall 32 to provide heating of the contents of the pot 30 as required. A barrier 34 is mounted between the side plates 11 and 12 to maintain different portions of the conducting fluid within the pot on opposite sides of the barrier or baffle 34 at different temperatures.

Out beyond the free end of the chamber 5 are suitably mounted two sheaves 35 and 36 on two shafts 35a and 36a secured in a fixed position.

As viewed in FIG. 1 the strip S first passes around the sheave 35, through the chamber portion 5b, over the sheave 7, down around the sheave 16, around sheaves 18 and 17, up through the tube 22, around the sheaves 27, 28 and 29, through the tube 23, around the sheaves 19 and 15, up and around the sheave 6, past the incoming strip portion and finally out around the sheave 36. Although the apparatus would appear as it does in FIG. 1 if only one strip S is being heat treated, it is apparent from FIG. 2 that two strips can be heat treated simultaneously. Also, the apparatus lends itself to heat treating many strips simultaneously by passing them through paths parallel to that as shown in FIG. 1.

In FIG. 4 is schematically indicated the electrical circuit used in the apparatus of FIGS. 1 and 2. A primary winding 20 and a primary winding 21 around the core 13 are in series with each other and a primary winding 20 and a primary winding 21 around the core 14 are in series with each other. The series windings 20 and 21 of the core 13 are in parallel with the series windings 20 and 21 of the core 14 and they are both connected to a common input voltage source across terminals 37 and 38. Each primary for each core consists of the two primary windings 20 and 21 which are wound to aid each other. The reason for this is that each winding 20 and 21 can be positioned on opposite sides of a core, as shown in FIG. 3, in order to provide more even heating than if a single primary was placed on one side of each core. Since the strip moves upward past the primaries on the core 13 and downward in the opposite direction past the core 14, the respective primary coils 20 and 21 on one core are wound opposite to those on the other core so that the primaries on one core are electrically aiding each other.

In operation, the pot 30 is filled with a liquid conducting medium, such as molten lead, to the level 39. The pot 30 is lowered away from the sheaves 15 to 19 and the strip is initially threaded through the apparatus to follow an irregular path as shown in FIGS. 1 and 4. The pot 30 is then elevated through the piston rod 32 and the platen 31 until it assumes the position as shown in FIGS. 1, 2 and 4. At that time, the molten lead in the pot surrounds all of the sheaves 15 to 19 and the lead creates an electrical conducting passage between regions 40 and 41 of the strip S without creation of any arcing because this conducting passage is below the surface of the molten lead. The conducting passage effectively closes the looped portion 43 of the strip between the regions 40 and 41 and this is the secondary loop which provides the transformer type heating of the apparatus when appropriate voltage is applied between the terminals 37 and 38 to the primary windings 20 and 21.

*Example*

In order to understand the operation of the apparatus, it may be helpful to understand the following typical heat treating cycle and the specific conditions existing for it.

Considering the heat treating of a fifteen foot loop of medium carbon steel strip (although low or high carbon steel can be treated) having a width of from ⅝ inch to 1¼ inch and a thickness of .020 to .035 inch, each primary coil 20 and 21 is provided with 7 turns of two strand No. 3 American Wire Gauge square copper wire so that each total primary comprised of a coil 20 and a coil 21 has a total of 14 turns of two strand wire. With a primary input voltage of 550 volts across terminals 37 and 38, it is possible to heat treat the strip through a heat treating cycle, hereinafter described, with the strip moving at about 100 feet per minute. For example, assume that the heater 33 is controlled by means of a thermocouple to maintain a temperature of the lead in the pot at about 900 degrees adjacent the bottom of the pot. All temperatures will be intended as degrees Fahrenheit. Because the hotter lead rises to the top, it is possible that the top portion of the molten lead may be approximately 1200 degrees, depending upon the amount of heat transfer from the Strip S and the insulation of the pot. By appropriately proportioning all of the parts of the apparatus, it is possible to pass the strip S at room temperature of about 70 degrees F. around the sheave 35. The strip passes into the chamber portion 5b at that temperature and, by regenerative heating through heat loss from the strip portion leaving the chamber below it, it is heated to about 375 degrees by the time it reaches sheave 7a. Then, it passes down vertically to the lead pot and around the sheave 16 where it is brought to a temperature of about 900 degrees, the temperature of the lead. It then passes through the lead and around the sheaves 18 and 17 to approach the 1200 degree temperature at the surface of the lead. After emerging from the lead at about 1200 degrees, it passes upward vertically through the tube 22 to be heated by induction from the primary coils 20 and 21 on the core 13 to a temperature of about 1350 degrees by the time it passes around the sheave 28. Turning downward vertically, the strip then passes through the tube 23 to be heated further by induction from the primary coils 20 and 21 of the core 14 to a temperature of about 1550 degrees. It then passes into the lead and is almost immediately cooled back to about 900 degrees by the time it passes around sheave 19. The strip then passes through the lead bath to and around sheave 15, and then upward around sheave 6 without any appreciable temperature drop. Passing from sheave 6 to sheave 36 it is cooled by regeneration from 900 degrees to about 400 degrees as it passes the incoming strip, and thereafter emerges into the open to cool down to room temperature.

The example given is merely for purposes of illustration. It is easily possible to vary the different temperatures of the heat treating cycle by varying the lengths through which the strip passes from sheave to sheave and by changing the input voltage to the primary and by varying the temperature of the molten lead in the pot 30. Also, the temperatures can be varied by thermally insulating more or less at different regions of the apparatus. In addition, the number of primaries can be changed so that one or more primaries can be used to obtain desired temperatures, or the primaries can be provided with intermediate taps.

The controlled atmosphere chamber 24 may be provided with gases or chemicals for additionally treating the strip as it passes through this chamber.

The baffle 34 positioned between the sheaves 16 and 17 is used to maintain larger temperature differences in the regions on opposite sides of the baffle 34 than would be possible without the baffle. The baffle merely restricts the flow of lead through the pot in its region and decreases heat transfer if made of a non-conducting material. Only two strips S are shown passing through the apparatus. It should be obvious that one or more strips can be heat treated simultaneously by enlarging the sheaves to accommodate the required number of strips in positions adjacent to each other.

It should be apparent that an apparatus has been provided which heats the strip primarily by induction while using the strip itself as a secondary of a transformer. In order to electrically close the strip loop and minimize arcing, a common cause of power loss and deterioration of the sheaves, a pot 30 of conducting fluid, such as molten lead, is used. The conducting fluid has an additional function of acting as a quenching bath in combination with its function as an electrical conductor. The apparatus has an additional feature of regenerative heating and cooling through its chamber 5b so that the efficiency of the system is maintained substantially high. With apparatus of the type shown it is possible to provide a heat treating system for continuously moving metal strip which utilizes a relatively small space and is thermally quite efficient and overcomes many of the disadvantages of previous known devices.

It should be understood that the invention can be made in many different ways without departing from the true scope of the invention as defined by the appended claims.

We claim:

1. A heat treating and quenching apparatus for continuously heating and cooling metal strip comprising, a primary induction means, means for advancing said strip past said primary induction means, and a bath of electrically conductive fluid in direct electrically conductive contact with the metal of both the portion of strip advancing toward the primary induction means and the portion of strip leaving said primary induction means, said bath thereby providing a conductive electrical path between the two said portions to form them into a secondary loop which is heated by induction from said primary induction means, and means for controlling the temperature of the bath to control the temperature of the strip as it passes through the bath at a temperature below the temperature the strip attains by said induction heating.

2. A heat treating and quenching apparatus for continuously heating and cooling metal strip comprising, a primary induction means, a bath of electrically conductive fluid, means for causing the strip to follow a path leading into the bath with its metal in direct electrical conduction with the bath, out of the bath past the primary induction means, back into the bath and into direct electrical conduction with the bath to thereby form a closed loop secondary induction means out of the strip and the bath, and back out of the bath past the portion of the path initially leading into the bath, said last mentioned path portion causing the incoming strip portion to be heated and the outgoing strip portion to be cooled by heat transfer between the two strip portions.

3. A heat treating and quenching apparatus for continuously heating and cooling metal strip comprising, a primary induction means, a bath of molten lead, means for causing the strip to follow a path leading into the bath with its metal in direct electrical conduction with the bath, out of the bath past the primary induction means, back into the bath and into direct electrical conduction with the bath to thereby form a closed loop secondary induction means out of the strip and the bath, and back out of the bath past the portion of the path initially leading into the bath, said last mentioned path portion causing the incoming strip portion to be heated and the outgoing strip portion to be cooled by heat transfer between the two strip portions.

4. A heat treating and quenching apparatus for continuously heating and cooling metal strip comprising, means for establishing an alternating primary electromagnetic field, means for advancing said strip through said primary field, and a bath of electrically conductive fluid in direct electrically conductive contact with both the portion of strip advancing toward said primary field and the portion of strip leaving said primary field, said bath thereby providing a conductive electrical path between the two said portions to form them into a secondary loop which is heated by induction from said field, and means for controlling the temperature of the bath to control the temperature of the strip as it passes through the bath at a temperature below the temperature the strip attains by said induction heating.

5. A heat treating and quenching apparatus for continuously heating and cooling metal strip comprising, a primary induction means, a bath of electrically conductive fluid in direct electrically conductive contact with both the portion of strip advancing toward the primary induction means and the portion of strip leaving said primary induction means to thereby form a closed loop secondary induction means out of the strip and the bath, and a baffle immersed in said bath in a location between the advancing portion of strip and the leaving portion of strip to thermally separate portions of the bath and said portions of strip from each other without separating the path of flow of fluid between said separate portions of the bath, said baffle thereby facilitating maintaining said separate portions of the bath at different temperatures.

6. A heat treating and quenching apparatus for continuously heating and cooling metal strip comprising, an electrical primary induction means, and a bath of electrically conductive fluid, said primary induction means being divided into two portions, each portion comprising an annular shaped metal core having a central opening through which the metal strip can be freely passed longitudinally, each metal core being wound on opposite portions with separate primary windings connected in series to electrically aid each other, means for causing an elongated metal strip to follow a path into the bath with its metal surface in direct electrical conduction with the bath, out of the bath in one direction through the central opening of one of said annular shaped metal cores, then reversed in the opposite direction through the central opening of the other of said annular shaped metal cores, into the bath and into direct electrical conduction therewith to thereby form a closed loop secondary induction means out of the strip and the bath, and back out of the bath substantially parallel to and in proximity to the portion of the strip initially leading into the bath to cause the incoming strip portion to be heated and the outgoing strip portion to be cooled by heat transfer between the two strip portions and thereby decrease heat input requirements for the apparatus, substantially the entire path of the strip being within a closed compartment which is at least partially thermally insulated to decrease heat loss to the atmosphere surrounding the apparatus, the portion of the strip forming the closed loop secondary induction means being substantially air tight and containing an inert atmosphere.

7. A heat treating and quenching apparatus for continuously heating and cooling metal strip comprising, an electrical primary induction means, and a bath of electrically conductive fluid, said primary induction means being divided into two portions, each portion comprising an annular shaped metal core having a central opening through which the metal strip can be freely passed longitudinally, each metal core being wound on opposite portions with separate primary windings connected in series to electrically aid each other, means for causing an elongated metal strip to follow a path into the bath with its metal surface in direct electrical conduction with the bath, out of the bath in one direction through the central opening of one of said annular shaped metal cores, then reversed in the opposite direction through the central opening of the other of said annular shaped metal cores, into the bath and into direct electrical conduction therewith to thereby form a closed loop secondary induction means out of the strip and the bath, and back out of the bath substantially parallel to and in proximity to the portion of the strip initially leading into the bath to cause the incoming strip portion to be heated and the outgoing strip portion to be cooled by heat transfer between the two strip portions and thereby decrease heat input requirements for the apparatus.

8. A heat treating and quenching apparatus for continuously heating and cooling metal strip comprising, an electrical primary induction means, and a bath of electrically conductive fluid, said primary induction means being divided into two portions, each portion comprising an annular shaped metal core having a central opening through which the metal strip can be freely passed longitudinally, each metal core being wound on opposite portions with separate primary windings connected in series to electrically aid each other, means for causing an elongated metal strip to follow a path into the bath with its metal surface in direct electrical conduction with the bath, out of the bath in one direction through the central opening of one of said annular shaped metal cores, then reversed in the opposite direction through the central opening of the other of said annular shaped metal cores, into the bath and into direct electrical conduction therewith to thereby form a closed loop secondary induction means out of the strip and the bath, and back out of the bath substantially parallel to and in proximity to the portion of the strip initially leading into the bath to cause the incoming strip portion to be heated and the outgoing strip portion to be cooled by heat transfer between the two strip portions and thereby decrease heat input requirements for the apparatus, substantially the entire path of the strip being within a closed compartment which is at least partially thermally insulated to decrease heat loss to the atmosphere surrounding the apparatus.

9. A heat treating and quenching apparatus for continuously heating and cooling metal strip comprising, a primary induction means, means for advancing said strip past said primary induction means, and a bath of electrically conductive fluid in direct electrically conductive contact with the metal of both the portion of strip advancing toward the primary induction means and the portion of strip leaving said primary induction means, said bath thereby providing a conductive electrical path between the two said portions to form them into a secondary loop which is heated by induction from said primary induction means, means for controlling the temperature of said bath at a temperature to cause the strip as it passes through the bath to be cooled to a controlled temperature below the temperature it attains by said induction heating, substantially the entire path of the strip being within a closed compartment which is at least partially thermally insulated to decrease heat loss to the atmosphere surrounding the apparatus.

10. A heat treating and quenching apparatus for continuously heating and cooling metal strip comprising, a primary induction means, a bath of electrically conductive fluid, means for causing the strip to follow a path leading into the bath with its metal in direct electrical conduction with the bath, out of the bath past the primary induction means, back into the bath and into direct electrical conduction with the bath to thereby form a closed loop secondary induction means out of the strip and the bath, and back out of the bath past the portion of the path initially leading into the bath, said last mentioned path portion causing the incoming strip portion to be heated and the outgoing strip portion to be cooled by heat transfer between the two strip portions, substantially the entire path of the strip being within a closed compartment which is at least partially thermally insulated to decrease heat loss to the atmosphere surrounding the apparatus.

11. A heat treating and quenching apparatus for continuously heating and cooling metal strip comprising, a primary induction means, means for advancing said strip past said primary induction means, and a single heated bath of electrically conductive fluid in direct electrically conductive contact with the metal of both the strip portion advancing toward the primary induction means and the strip portion leaving said primary induction means whereby the strip portion advancing toward the primary induction means is heated by said single heated bath and the strip portion leaving said primary induction means is quenched by said single heated bath, said single bath providing a direct conductive electrical path between the two strip portions to form them into a secondary loop which is heated by induction from said primary induction means prior to said strip portion leaving said primary means being quenched by the single heated bath.

12. A heat treating and quenching apparatus for continuously heating and cooling metal strip comprising, an electrical primary induction means, and a single heated bath of electrically conductive fluid, said primary induction means being divided into two portions, each portion comprising an annular shaped metal core having a central opening through which the metal strip can be freely passed longitudinally, means for causing an elongated metal strip to follow a path into the single bath with its metal surface in direct electrical conduction with the bath whereby the metal is heated by the bath, out of the bath in one direction through the central opening of one of said annular shaped metal cores, then reversed in the opposite direction through the central opening of the other of said annular shaped metal cores, into the bath and into direct electrical conduction therewith to thereby form a closed loop secondary induction means out of the strip and the bath which closed loop is heated by electrical induction when electric current is directed through said primary means, said single bath also quenching and cooling the portion of the strip entering the bath exiting from the central opening of said other of said annular shaped metal cores to a temperature below the temperature to which said closed loop is heated by induction.

References Cited by the Examiner

UNITED STATES PATENTS

| | | | |
|---|---|---|---|
| 2,417,030 | 3/1947 | Wilson et al. | 219—10.61 |
| 2,427,485 | 9/1947 | Wilson | 219—10.61 |
| 2,437,776 | 3/1948 | Wilson | 219—10.61 |
| 2,502,770 | 4/1950 | Watson | 219—10.61 |
| 2,525,203 | 10/1950 | Bostroem | 219—10.61 |
| 2,930,724 | 3/1960 | Rudd. | |
| 2,932,502 | 4/1960 | Rudd et al. | 266—3 |

FOREIGN PATENTS 915,394  11/1946  France.

JOHN F. CAMPBELL, *Primary Examiner.*

MAX L. LEVY, RICHARD M. WOOD, *Examiners.*

L. H. BENDER, *Assistant Examiner.*